(12) United States Patent
Abdelghaffar et al.

(10) Patent No.: US 12,376,081 B2
(45) Date of Patent: Jul. 29, 2025

(54) METHODS AND APPARATUS FOR CROSS LINK INTERFERENCE MITIGATION

(71) Applicant: QUALCOMM Incorporated, San Diego, CA (US)

(72) Inventors: Muhammad Sayed Khairy Abdelghaffar, San Jose, CA (US); Marco Papaleo, Bologna (IT); Krishna Kiran Mukkavilli, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 17/362,549

(22) Filed: Jun. 29, 2021

(65) Prior Publication Data

US 2022/0022183 A1    Jan. 20, 2022

Related U.S. Application Data

(60) Provisional application No. 63/053,507, filed on Jul. 17, 2020.

(51) Int. Cl.
*H04W 72/0446* (2023.01)
*H04L 5/00* (2006.01)
*H04L 5/14* (2006.01)
*H04W 24/08* (2009.01)

(52) U.S. Cl.
CPC ....... *H04W 72/0446* (2013.01); *H04L 5/0048* (2013.01); *H04L 5/14* (2013.01); *H04W 24/08* (2013.01)

(58) Field of Classification Search
CPC .................................................. H04W 72/0446
See application file for complete search history.

(56) References Cited

U.S. PATENT DOCUMENTS

| 10,727,983 B2 | 7/2020 | Damnjanovic et al. |
| 2019/0053085 A1* | 2/2019 | Pao .................. H04L 5/1469 |
| 2021/0099988 A1* | 4/2021 | Wu .................. H04L 5/0091 |

(Continued)

FOREIGN PATENT DOCUMENTS

| CN | 106559872 A | 4/2017 |
| WO | 2016069141 A1 | 5/2016 |

OTHER PUBLICATIONS

International Search Report and Written Opinion—PCT/US2021/039965—ISA/EPO—Oct. 25, 2021.

(Continued)

*Primary Examiner* — Abdeltif Ajid
(74) *Attorney, Agent, or Firm* — Procopio, Cory, Hargreaves & Savitch LLP

(57) ABSTRACT

The present disclosure relates to methods and devices for wireless communication including an apparatus, e.g., a user equipment (UE) and/or base station. In one aspect, the apparatus may configure a frame structure including a plurality of slots in a subframe, the plurality of slots including at least one of one or more downlink slots, one or more uplink slots, or one or more flexible slots, each of the one or more flexible slots including multiple subband resources. The apparatus may also signal configuration information of the frame structure including the plurality of slots. Additionally, the apparatus may communicate data via the frame structure including the plurality of slots.

25 Claims, 12 Drawing Sheets

(56) References Cited

U.S. PATENT DOCUMENTS

| | | | |
|---|---|---|---|
| 2022/0006603 A1* | 1/2022 | Lei | H04W 80/02 |
| 2022/0015100 A1* | 1/2022 | Yerramalli | H04L 5/0023 |
| 2022/0103321 A1* | 3/2022 | Huss | H04L 25/0232 |
| 2023/0232422 A1* | 7/2023 | Lee | H04W 72/23 |
| | | | 370/329 |
| 2023/0292304 A1* | 9/2023 | Oh | H04W 72/23 |

OTHER PUBLICATIONS

Nokia, et al., "Multiple Rate Matching Patterns with M-TRP", Draft, 3GPP TSG-RAN WG2 Meeting #109 e, 3rd Generation Partnership Project (3GPP), Mobile Competence Centre, 650, Route Des Lucioles, F-06921 Sophia-Antipolis Cedex, France vol. RAN WG2, No. Elbonia, Feb. 24, 2020-Mar. 6, 2020 Feb. 13, 2020 (Feb. 13, 2020), XP051848649, 28 Pages, URL: https://ftp.3gpp.org/tsg_ran/WG2_RL2/TSGR2_109_e/Docs/R2-2000860.zipR2-2000860 Multiple Rate Matching Patterns with M-TRP.docx [retrieved on Feb. 13, 2020] Section 2.2, par. 1.

* cited by examiner

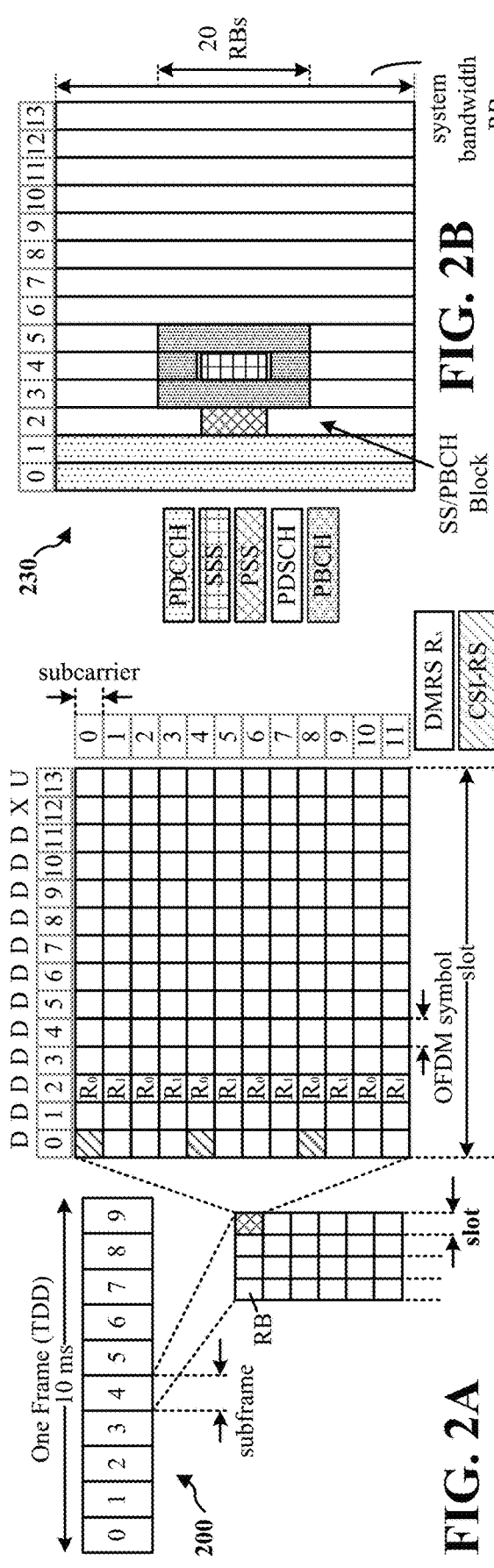
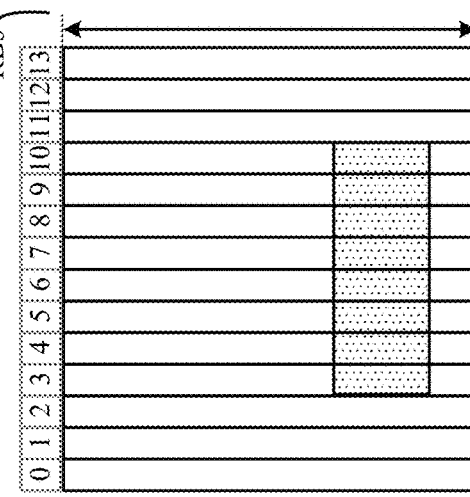
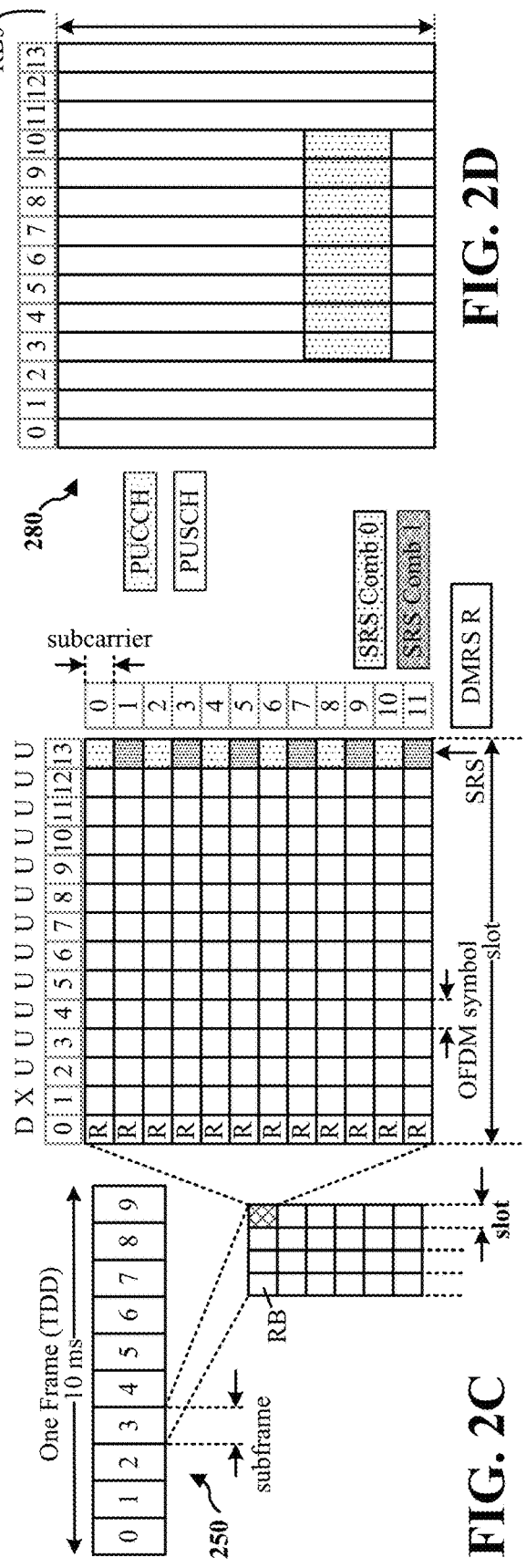
FIG. 2A  FIG. 2B  FIG. 2C  FIG. 2D

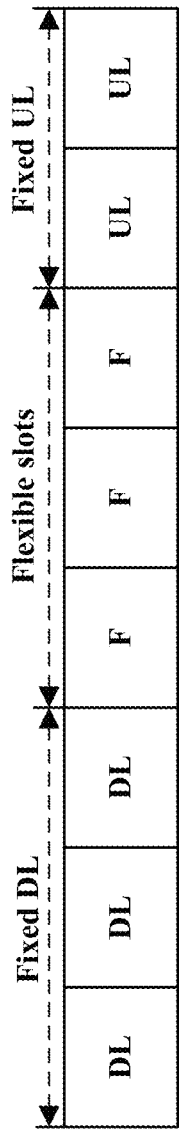
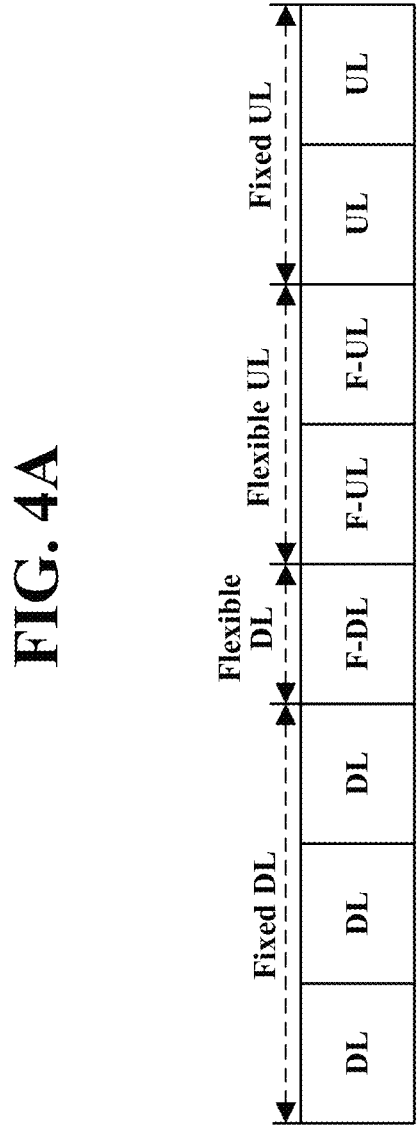
FIG. 4A
FIG. 4B

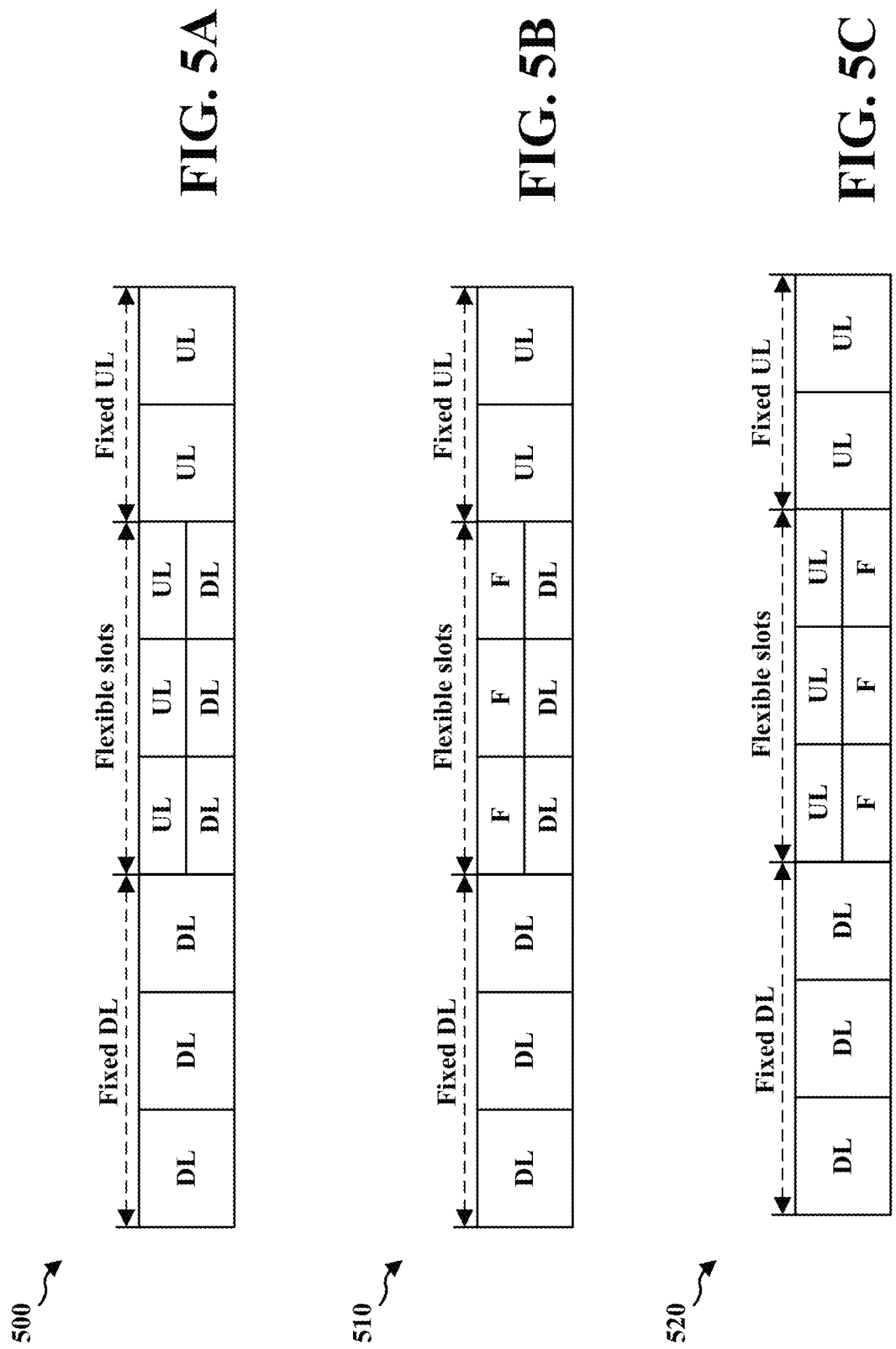

METHODS AND APPARATUS FOR CROSS LINK INTERFERENCE MITIGATION

CROSS REFERENCE TO RELATED APPLICATION(S)

This application claims the benefit of U.S. Provisional Application Ser. No. 63/053,507, entitled "METHODS AND APPARATUS FOR CROSS LINK INTERFERENCE MITIGATION" and filed on Jul. 17, 2020, which is expressly incorporated by reference herein in its entirety.

TECHNICAL FIELD

The present disclosure relates generally to communication systems, and more particularly, to frame structures in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The apparatus may configure a frame structure including a plurality of slots in a subframe, the plurality of slots including at least one of one or more downlink slots, one or more uplink slots, or one or more flexible slots, each of the one or more flexible slots including multiple subband resources. The apparatus may also signal configuration information of the frame structure including the plurality of slots. The apparatus may also communicate data via the frame structure including the plurality of slots. Additionally, the apparatus may determine whether a portion of the multiple subband resources is utilized to communicate the data. The apparatus may also receive a measurement of the multiple subband resources from a user equipment (UE). The apparatus may also signal a utilization of the multiple subband resources. Moreover, the apparatus may stop transmission of the CRS via the multiple subband resources. The apparatus may also rate match the multiple subband resources based on the CRS. The apparatus may also adjust a beam direction including the data or adjusting a transmission configuration indication (TCI) state of the data based on interference. Further, the apparatus may map the at least one downlink signal or at least one uplink signal to a direction of the multiple subband resources. The apparatus may also determine a bandwidth difference between the signal bandwidth and the multiple subband resources. The apparatus may also cancel the at least one downlink signal or drop the at least one uplink signal when the bandwidth difference is greater than a bandwidth threshold.

In another aspect of the disclosure, a method, a computer-readable medium, and an apparatus are provided. The apparatus may be a user equipment (UE). The apparatus may receive configuration information of a frame structure including a plurality of slots in a subframe, the plurality of slots including at least one of one or more downlink slots, one or more uplink slots, or one or more flexible slots, each of the one or more flexible slots including multiple subband resources. The apparatus may also communicate data via the frame structure including the plurality of slots. The apparatus may also transmit a measurement of the multiple subband resources to a base station. The apparatus may also drop the at least one downlink signal or cancel the at least one uplink signal when the bandwidth difference is greater than a bandwidth threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 4A and 4B are diagrams illustrating example frame structures in accordance with one or more techniques of the present disclosure.

FIGS. 5A, 5B, and 5C are diagrams illustrating example frame structures in accordance with one or more techniques of the present disclosure.

DETAILED DESCRIPTION

Figure 1:
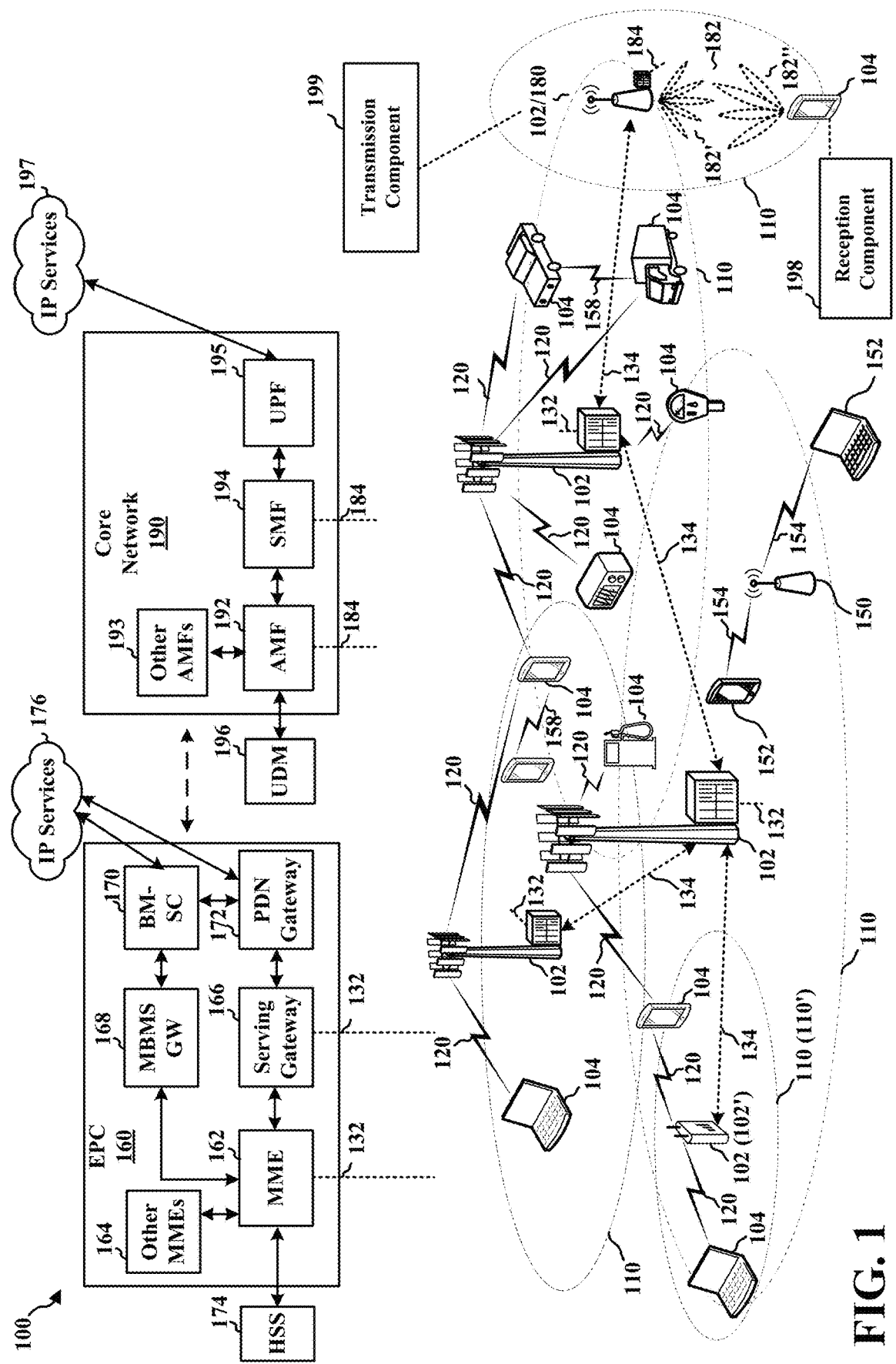
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a transmission component 199 configured to configure a frame structure including a plurality of slots in a subframe, the plurality of slots including at least one of one or more downlink slots, one or more uplink slots, or one or more flexible slots, each of the one or more flexible slots including multiple subband resources. Transmission component 199 may also be configured to signal configuration information of the frame structure including the plurality of slots. Transmission component 199 may also be configured to communicate data via the frame structure including the plurality of slots. Transmission component 199 may also be configured to determine whether a portion of the multiple subband resources is utilized to communicate the data. Transmission component 199 may also be configured to receive a measurement of the multiple subband resources from a user equipment (UE). Transmission component 199 may also be configured to signal a utilization of the multiple subband resources. Transmission component 199 may also be configured to stop transmission of the CRS via the multiple subband resources. Transmission component 199 may also be configured to rate match the multiple subband resources based on the CRS. Transmission component 199 may also be configured to adjust a beam direction including the data or adjusting a transmission configuration indication (TCI) state of the data based on interference. Transmission component 199 may also be configured to map the at least one downlink signal or at least one uplink signal to a direction of the multiple subband resources. Transmission component 199 may also be configured to determine a bandwidth difference between the signal bandwidth and the multiple subband resources. Transmission component 199 may also be configured to cancel the at least one downlink signal or drop the at least one uplink signal when the bandwidth difference is greater than a bandwidth threshold.

Referring again to FIG. 1, in certain aspects, the UE 104 may include a reception component 198 configured to receive configuration information of a frame structure including a plurality of slots in a subframe, the plurality of slots including at least one of one or more downlink slots, one or more uplink slots, or one or more flexible slots, each of the one or more flexible slots including multiple subband resources. Reception component 198 may also be configured to communicate data via the frame structure including the plurality of slots. Reception component 198 may also be configured to transmit a measurement of the multiple subband resources to a base station. Reception component 198 may also be configured to drop the at least one downlink signal or cancel the at least one uplink signal when the bandwidth difference is greater than a bandwidth threshold.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
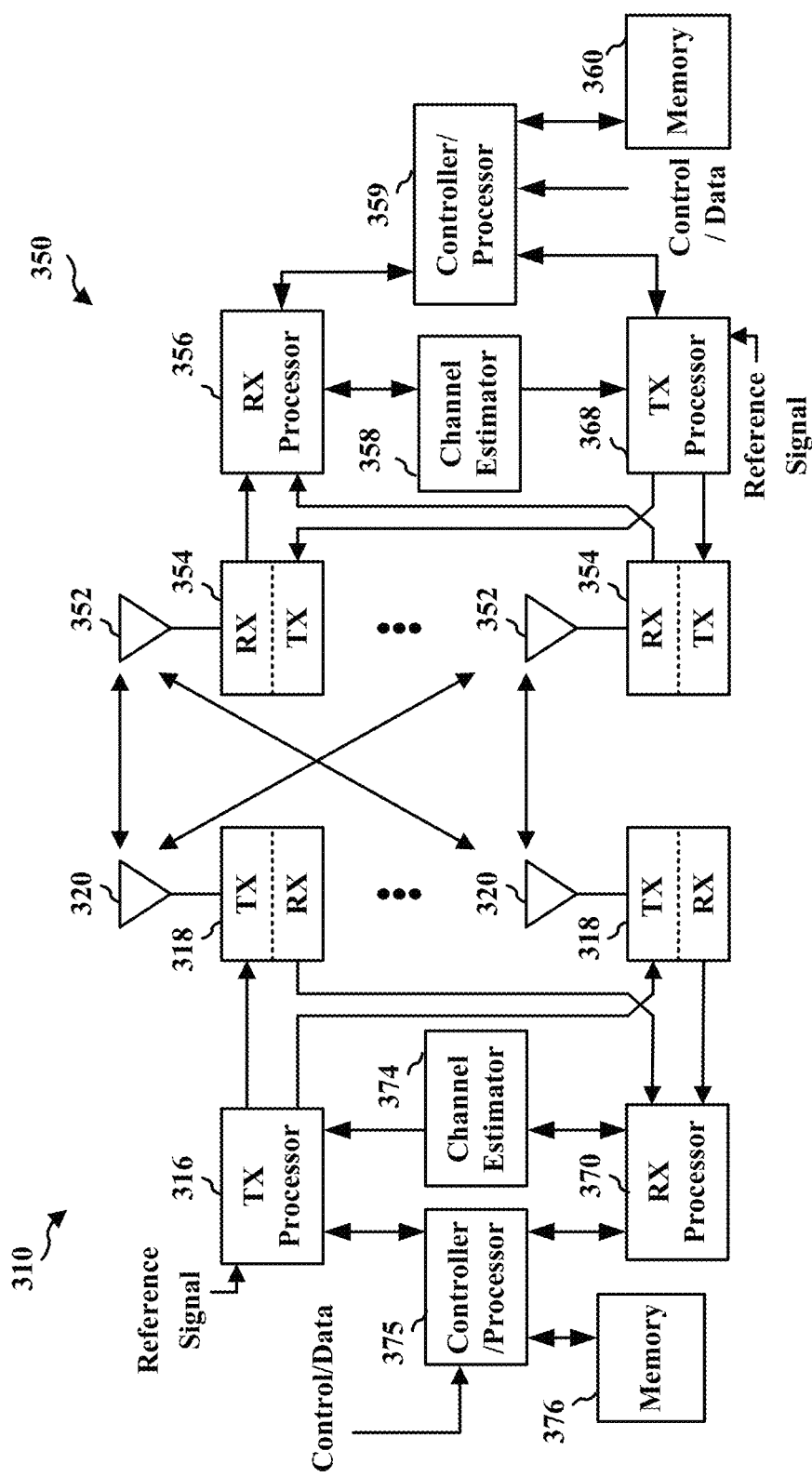
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium which may store computer executable code for wireless communication of a user equipment (UE), the code when executed by a processor (e.g., one or more of RX processor 356, TX processor 368, and/or controller/processor 359) instructs the processor to perform aspects of FIGS. 9, 10, and/or 11. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium which may store computer executable code for wireless communication of base station, the code when executed by a processor (e.g., one or more of RX processor 370, TX processor 316, and/or controller/processor 375) instructs the processor to perform aspects of FIGS. 9, 10, and/or 11. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Aspects of wireless communication may utilize the spectrum between multiple network operators across the borders of different countries. For instance, with cross link interference, different interference scenarios may occur when multiple time division duplex (TDD) networks are deployed in blocks within the same band, e.g., including co-channel cases and adjacent channel cases. Cross link interference may occur when simultaneous transmissions in uplink (UL) and downlink (DL) directions take place in different TDD networks. For example, cross link interference may occur when two networks are utilizing the same channel, as well as when the two networks are utilizing adjacent channels. This may result in interference leakage from one carrier to another carrier. There may also be interference between multiple base stations, multiple UEs, or in general cross link interference from uplink and/or downlink communications.

The aforementioned interference may be handled utilizing several modes of operation, such as synchronous, asynchronous, and semi-synchronous operations. In some aspects, the simultaneous UL/DL transmissions may not take place in synchronized operations while such transmissions may take place in unsynchronized or desynchronized operations. In synchronous operations, no simultaneous UL or DL transmissions may occur. So at any given moment, either all networks may perform DL communication or all networks may perform UL communication. This may help avoid interference between the transmission of one base station and the reception of another base station in the same network or an adjacent network. Also, this may include a common or compatible frame structure with time and phase synchronization between networks. For example, a common frame structure may include downlink transmissions at a certain time and uplink transmissions at a certain time. For instance, each slot over a certain time period may be downlink transmissions, and each slot over another time period may be uplink transmissions. An operator may align the slots to the baseline direction or blank a flexible portion.

In asynchronous operations, the operation may not need the adoption of a compatible frame structure. For instance, each network may be in uplink or downlink mode without considering other networks. This may result in a higher likelihood of interference. In semi-synchronous operations, a portion of the frame is consistent with synchronized operations described above, while the remaining portion of the frame is consistent with unsynchronized operations. This may lead to a limited degree of frame structure flexibility at the expense of some additional interference. So semi-synchronous operations may include flexible slots. This may result in the adoption of a frame structure for all TDD networks, including slots where the UL or DL direction is not specified. Also, the control plane may be protected by ensuring that the control signals do not belong to the flexible part of the frame. This may provide some degree of freedom while including some level of interference.

FIGS. 4A and 4B are diagrams 400 and 410, respectively, illustrating example frame structures. As shown in FIG. 4A, diagram 400 is a semi-synchronous frame structure with fixed downlink slots, fixed uplink slots, and flexible slots. The flexible slots may be either DL or UL in order to reduce interference. As shown in FIG. 4A, in semi-synchronous frame structures, there may be fixed or controlled slots at the beginning and end of the frame structure, along with flexible slots in the middle which may be either downlink or uplink.

As shown in FIG. 4B, diagram 410 includes multiple frame structures for multiple operators, e.g., operator 412 and operator 414. The frame structure for operator 412 includes fixed DL slots, fixed UL slots, and flexible slots, which may be flexible DL (F-DL) slots or flexible UL (F-UL) slots. The frame structure for operator 414 includes fixed DL slots, fixed UL slots, and flexible slots, which may be flexible DL (F-DL) slots. FIG. 4B displays that there may be flexible uplink slots in one transmission direction and flexible downlink slots in another transmission direction.

As indicated herein, semi-synchronous operations may include compatible frame structures. In semi-synchronous operations, there may be a default frame structure as with synchronized operations for which UL and DL directions are defined across the entire frame. Additionally, there may be a portion of the frame structure where each operator is allowed to reverse the default transmission direction. Moreover, a baseline direction may be defined in the flexible portion. There may also be DL to UL modifications where the default DL transmission direction in the flexible portion of the frame is modified into an UL transmission. From a base station-to-base station interference perspective, the network that modifies the default DL into UL transmissions may not interfere with the other networks, but it may receive additional interference from the other networks. For UL to DL modifications, the default UL transmission direction in the flexible portion may be modified into DL. From a base station-to-base station interference perspective, the network that modifies the default UL transmission direction into DL may interfere with the other network while it may not receive additional interference from the other network.

In wireless communications, downlink blanking is when a downlink slot is blanked or left empty to avoid interference. So in an attempt to avoid cross interference, one network or base station may blank a slot or not send data in the slot. In some aspects, one or more symbols in the slot in the frame may be blanked, such as in an 'S' slot structure.

Additionally, some aspects of wireless communication may utilize 5G new radio (NR) and LTE TDD frame structures for synchronized operations. For instance, each LTE TDD frame configuration may have at least one compatible 5G NR equivalent configuration. Two example variants may be considered for an LTE TDD framework, e.g., a 'DSUDD' LTE TDD framework. In some aspects, the slot time period for NR may be half of the slot time period for LTE. For example, LTE TDD and 5G NR may have an aligned frame start, e.g., a 'DDDSUUDDD' frame structure. Further, LTE TDD and 5G NR may include a non-zero frame start offset, e.g., a 'DDDDDDDSUU' frame structure.

In some aspects, when a network or base station wants to adapt a frame structure that has some slots with different directions than a baseline slot structure, the network may perform a number of different operations. For example, the network may perform synchronous operations, such as by either blanking slots or symbols or following the baseline frame structure. This may result in no interference and/or less flexibility or loss of spectral efficiency (SE) as some of the resources may not be utilized. The network may also perform semi-synchronous operations including some controlled interference and/or improved flexibility.

Based on the above, it may be beneficial to expand into the frequency domain dimension as a solution for adding flexible slot coverage. It may also be beneficial to split the channel bandwidth to uplink and downlink bands and utilize part of the available bandwidth to reduce and/or control interference. Moreover, it may be beneficial to partition flexible slots.

Aspects of the present disclosure may utilize the frequency domain dimension as a solution for adding flexible slot coverage. Additionally, aspects of the present disclosure may split the channel bandwidth to uplink and downlink bands and utilize part of the available bandwidth to reduce and/or control interference. Aspects of the present disclosure may also utilize flexible frequency domain partitioning of flexible slots. For instance, in semi-synchronous operations, aspects of the present disclosure may split the band within the flexible slot for uplink or downlink communication. As such, a portion of the band may be reserved for uplink communication and a portion of the band may be reserved for downlink communication. By doing so, the frequency resources may be limited, but the cross-border operators may utilize the subband of the flexible slot to operate in downlink or uplink mode.

Also, a split band structure, i.e., flexible slots including multiple subband resources, may reduce or eliminate the amount of interference on the flexible slots. So aspects of the present disclosure may include a flexible frequency division of the resources. Accordingly, the interference or leakage amount between slots may be reduced. For instance, if downlink communication is selected in the flexible slots, then the downlink communication is limited to a portion of the band. By doing so, another carrier may perform uplink communication in the other port of the band within the flexible slots without interfering with the downlink communication. So, the flexible slots may be divided based on the frequency band, such that each slot includes multiple subband resources. In some aspects, each channel within a band may be divided based on uplink or downlink resources.

Aspects of the present disclosure may also include flexible frequency division multiplexing (FDM) of the resources at the flexible resources. For instance, aspects of the present disclosure may include frequency based flexible slots of a baseline frame structure. In some instances, aspects of the present disclosure may include a fixed split of the bandwidth. Accordingly, the bandwidth of the flexible slot with the baseline frame may be split between a downlink subband and uplink subband. For example, operators may either choose to operate in DL in one portion of the band (i.e., DL subband) or UL in another portion of the band (i.e., UL subband). Also, the fixed directions in adjacent slots may be the same direction or opposite directions.

In some instances, aspects of the present disclosure may include a flexible split of the bandwidth. As such, the bandwidth of each of the flexible slots may be split into DL and flexible portions, UL and flexible portions, and/or multiple flexible portions. By doing so, a portion of the bandwidth may have a fixed direction while the remaining bandwidth may have flexible direction. In some instances, there may be DL resources in one spectrum, UL resources in another spectrum, and/or flexible resources in another spectrum. For example, where the bandwidth of the flexible slot is split into DL at a lower part of the band and a flexible portion at a high part of the band, the operator may choose DL resources in a lower spectrum or flexible (F) resources in a higher spectrum. This provides the possibility that when a flexible slot is operated as DL, then there may be no interference between the two operators. In both options, a network operator may be utilizing part of the bandwidth.

FIGS. 5A, 5B, and 5C are diagrams 500, 510, and 520, respectively, illustrating example frame structures in accordance with one or more techniques of aspects of the present disclosure. As shown in FIGS. 5A, 5B, and 5C, diagrams 500, 510, and 520 are semi-synchronous frame structures with fixed downlink slots, fixed uplink slots, and flexible slots. The fixed or controlled slots may be at the beginning and end of the frame structure, and the flexible slots may be in the middle of the frame structure. Each of the flexible slots may be divided into multiple subband resources, with either DL, UL, and/or flexible (F) resources.

As shown in FIG. 5A, each flexible slot is divided into multiple subband resources, with uplink resources in one portion of the subband and downlink resources in another portion of the subband. Diagram 500 in FIG. 5A corresponds to the fixed split of the bandwidth mentioned above. In FIG. 5B, each flexible slot is divided into flexible subband resources and downlink subband resources. The flexible subband resources provide carriers with the freedom to select either uplink or downlink communication within a portion of the flexible slot for that subband. So the flexible subband resources within a flexible slot may provide even more flexibility to the carriers. Diagram 510 in FIG. 5B corresponds to the flexible split of the bandwidth mentioned above. In FIG. 5C, each flexible slot is divided into uplink subband resources and flexible subband resources. Diagram 520 in FIG. 5C also corresponds to the flexible split of the bandwidth mentioned above. The flexible slot within the flexible part of the frame structure may have separate subband resources where the bandwidth of each subband may be different and/or the subband type being UL, DL, or flexible.

As indicated above, a common frame structure may inform carriers or base stations regarding how to divide multiple subband resources. Accordingly, these multiple subband resources may be uplink resources, downlink resources, and/or flexible resources. Also, flexible subband resources may be FDM resources and the width of the subband may be fixed per each symbol. In some instances, the carriers or base stations may have the opportunity to select the flexible multiple subband resources within each flexible slot.

Aspects of the present disclosure may also include inter-operator coordination, such as handshaking, to utilize an entire bandwidth. For instance, when multiple operators choose to operate in a same direction, they may utilize the whole bandwidth across the multiple subbands. So when one base station determines that the other base station is utilizing the flexible subband operating in the same direction, then both base stations may utilize the whole bandwidth within the flexible slot to operate in that direction. For example, if a base station operation in DL mode in one subband determines that the other base station is operating in DL mode in the other flexible subband, then both base stations may utilize the entire bandwidth (i.e., both subbands) to operate in DL mode.

In some aspects, an autonomous or base station-based structure may include listening or sensing to a portion of the band and determining the direction of the communication. Additionally, in a UE-based solution, a UE may measure and report the signal in one portion of the band. The UE may also report back, e.g., a measurement, to the base station. Also, there may be inter-base station signaling (such as layer three (L3) signaling) through a central unit, e.g., an intra-operator, which may include handshaking.

Additionally, aspects of the present disclosure may utilize an LTE common signal and/or an LTE synchronization signal. In some aspects for dynamic spectrum sharing (DSS) between LTE and NR at a same band, one operator may utilize LTE TDD and transmit a cell-specific reference symbol (CRS) even if there is no uplink or downlink transmission and/or it may not be flexible to re-configure or limit the bandwidth of these reference symbols. So LTE may not be able to shrink or expand the bandwidth. For instance, this may occur if a CRS is transmitting over an entire bandwidth. Aspects of the present disclosure may introduce CRS muting, i.e., an LTE aggressor, such that the CRS is not transmitted or received. Aspects of the present disclosure may also include NR downlink or rate matching at matched LTE resources, e.g., around the CRS. Also, aspects of the present disclosure may include an NR transmission configuration indication (TCI) change or beam management to a different direction to further minimize the impact. So aspects of the present disclosure may adjust a beam direction or adjust a TCI state, e.g., to avoid an overlap or collision with a CRS.

In some aspects, periodic signals, e.g., DL CSI-RS and UL SRS, may occur at the flexible frequency slots. For instance, a periodic signal direction, e.g., UL or DL, may map to the same direction of the bandwidth part (BWP). If the direction of the periodic signal (i.e., UL as SRS or DL as SSB or CSI-RS) matches the direction of the subband and the bandwidth of the periodic signal is entirely within the subband, then normal operation may be allowed. If the periodic signal direction matches the direction of the subband, however the frequency resources of the periodic signal partially overlap with the subband, then the signal may be dropped or canceled. Additionally, for the partial overlap scenario, the signal may be allowed based on a threshold. This may correspond to an overlapped bandwidth or subband. In another instance, the periodic signal direction may be in a different direction than the subband, such that it is dropped and/or canceled. For example, a DL CSI-RS may be configured to be transmitted in a flexible slot where the base station operates in an UL subband resource of that slot. Then, the base station may cancel the DL transmission of the CSI-RS signal.

Figure 6:
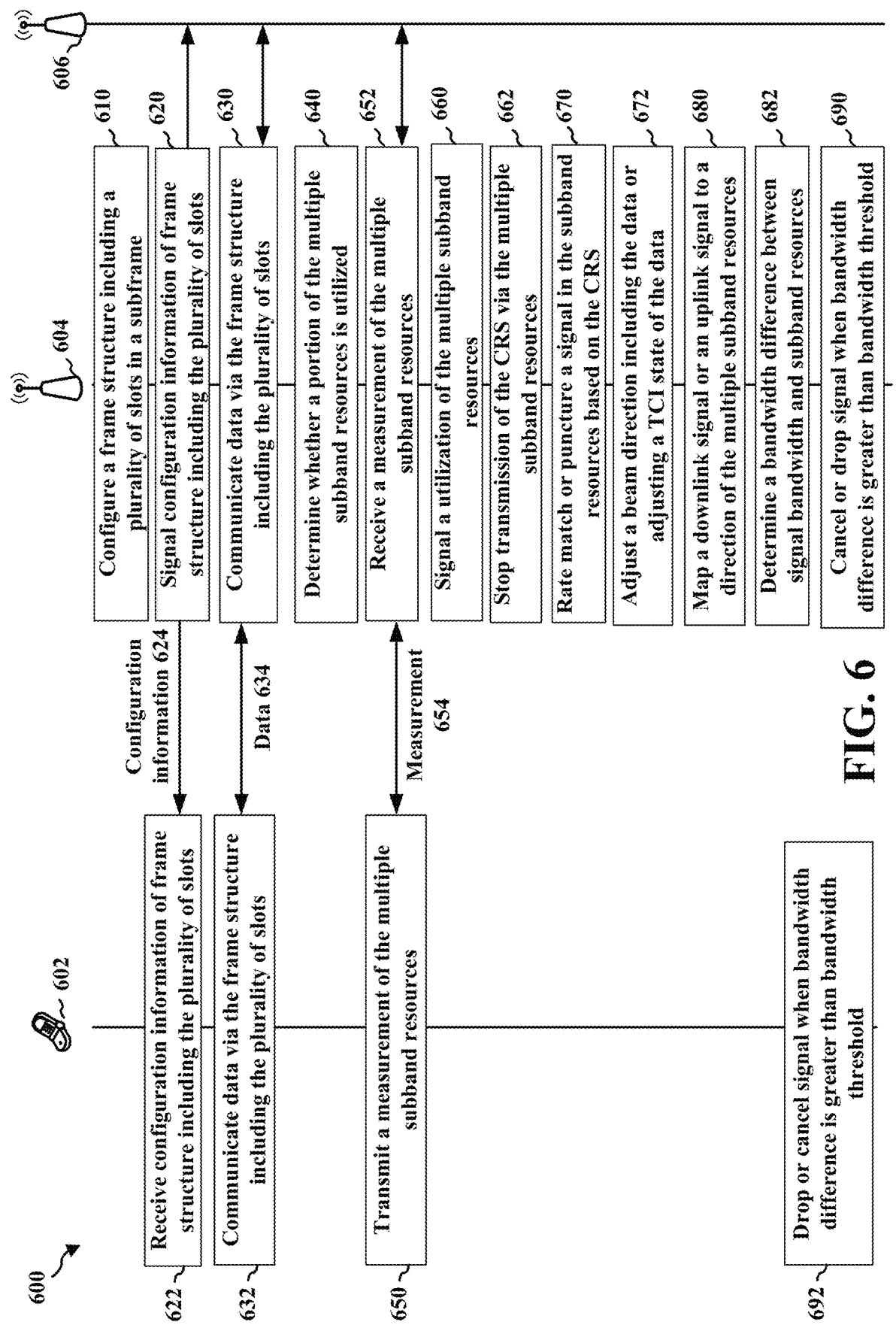
FIG. 6 is a diagram illustrating example communication between a UE and a base station in accordance with one or more techniques of the present disclosure.

FIG. 6 is a diagram 600 illustrating example communication between a UE 602 and a base station 604.

At 610, base station 604 may configure a frame structure including a plurality of slots in a subframe, the plurality of slots including at least one of one or more downlink slots, one or more uplink slots, or one or more flexible slots, each of the one or more flexible slots including multiple subband resources. In some instances, the multiple subband resources may be frequency division multiplexing (FDM) resources. Also, the frame structure may be a frequency division duplex (FDD) frame structure.

In some aspects, the multiple subband resources may include at least one of one or more flexible subband resources, one or more uplink subband resources, or one or more downlink subband resources. Also, the at least one of the one or more flexible subband resources, the one or more uplink subband resources, or the one or more downlink subband resources may be configurable or flexible. Further, each of the one or more flexible subband resources may include at least one uplink subband resource or at least one downlink subband resource.

At 620, base station 604 may signal configuration information of the frame structure including the plurality of slots, e.g., configuration information 624. For example, the signaled configuration information may be on or carried by layer 3, e.g., RRC, messages or layer 2, e.g., PDCCH, control channels. At 622, UE 602 may receive configuration information of the frame structure including a plurality of slots, e.g., configuration information 624. In some aspects, the configuration information of the frame structure including the plurality of slots may be signaled to another base station, e.g., base station 606, where the plurality of slots may include one or more flexible slots with multiple subband resources.

At 630, base station 604 may communicate data, e.g., data 634, via the frame structure including the plurality of slots. At 632, UE 602 may communicate data, e.g., data 634, via the frame structure including the plurality of slots. In some aspects, base station 604 may communicate data with another base station, e.g., base station 606.

At 640, base station 604 may determine whether a portion of the multiple subband resources is utilized to communicate the data.

At 650, UE 602 may transmit a measurement of the multiple subband resources, e.g., measurement 654, to base station 604. At 652, base station 604 may receive a measurement, e.g., measurement 654, of the multiple subband resources from UE 602. In some aspects, base station 604 may receive the measurement of the multiple subband resources from another base station, e.g., base station 606.

At 660, base station 604 may signal a utilization of multiple subband resources. In some aspects, a cell-specific reference symbol (CRS) may be transmitted, received, or communicated via the multiple subband resources of the frame structure.

At 662, base station 604 may stop transmission of the CRS via the multiple subband resources.

At 670, base station 604 may rate match or puncture a signal in the multiple subband resources based on the CRS.

At 672, base station 604 may adjust a beam direction including the data or adjusting a transmission configuration indication (TCI) state of the data based on interference.

In some aspects, the data may include at least one downlink signal or downlink channel or at least one uplink signal or uplink channel, where the at least one downlink signal or at least one uplink signal may include a signal bandwidth. Also, the at least one downlink signal may be a channel state information reference signal (CSI-RS), tracking reference signal (TRS), or synchronization signal and the at least one uplink signal may be a sounding reference signal (SRS).

At 680, base station 604 may map the at least one downlink signal or at least one uplink signal to a direction of the multiple subband resources.

At 682, base station 604 may determine a bandwidth difference between the signal bandwidth and the multiple subband resources.

At 690, base station 604 may cancel the at least one downlink signal or drop the at least one uplink signal when the bandwidth difference is greater than a bandwidth threshold. At 692, UE 602 may drop the at least one downlink signal or cancel the at least one uplink signal when the bandwidth difference is greater than a bandwidth threshold. In some instances, the bandwidth difference may be greater than the bandwidth threshold when the at least one downlink signal or the at least one uplink signal is at least partially outside a direction of the multiple subband resources.

Figure 7:
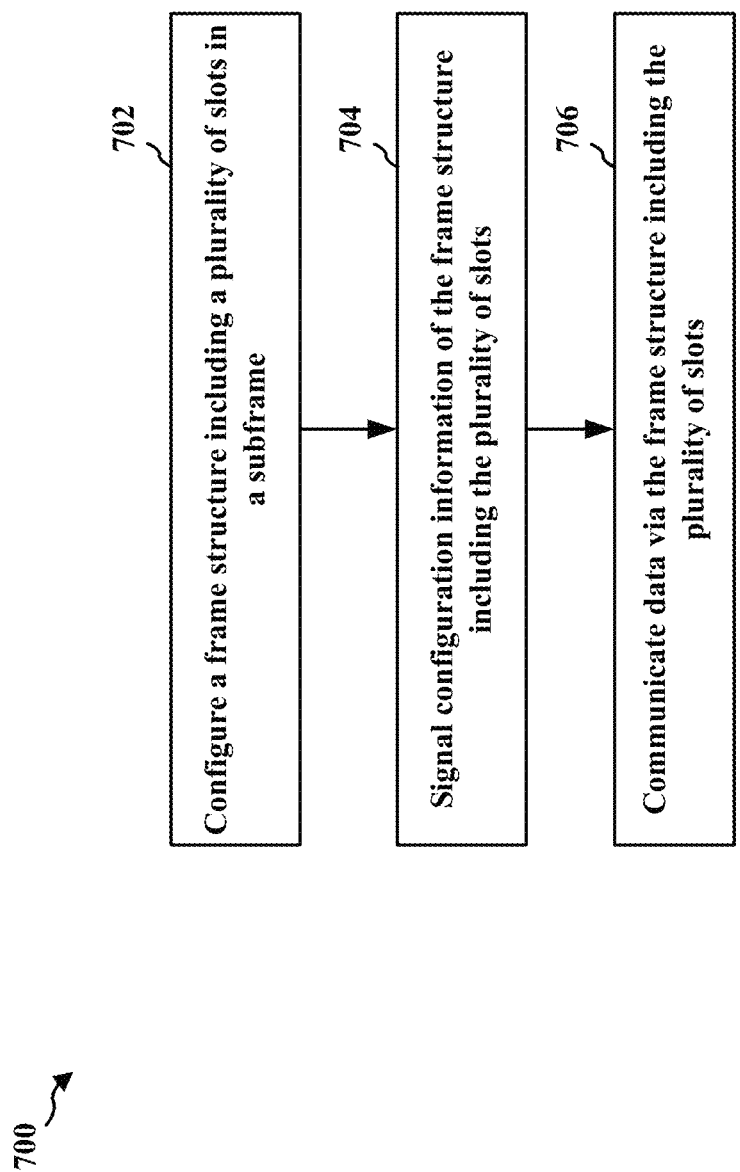
FIG. 7 is a flowchart of a method of wireless communication.

FIG. 7 is a flowchart 700 of a method of wireless communication. The method may be performed by a base station or a component of a base station (e.g., the base station 102, 180, 310, 604; apparatus 1102; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 702, the apparatus may configure a frame structure including a plurality of slots in a subframe, the plurality of slots including at least one of one or more downlink slots, one or more uplink slots, or one or more flexible slots, each of the one or more flexible slots including multiple subband resources, as described in connection with the examples in FIGS. 4A, 4B, 5A, 5B, 5C, and 6. For example, base station 604 may configure a frame structure including a plurality of slots in a subframe, the plurality of slots including at least one of one or more downlink slots, one or more uplink slots, or one or more flexible slots, each of the one or more flexible slots including multiple subband resources, as described in connection with 610 in FIG. 6. Further, 702 may be performed by determination component 1140 in FIG. 11. In some instances, the multiple subband resources may be frequency division multiplexing (FDM) resources, as described in connection with the examples in FIGS. 4A, 4B, 5A, 5B, 5C, and 6. Also, the frame structure may be a frequency division duplex (FDD) frame structure, as described in connection with the examples in FIGS. 4A, 4B, 5A, 5B, 5C, and 6.

In some aspects, the multiple subband resources may include at least one of one or more flexible subband resources, one or more uplink subband resources, or one or more downlink subband resources, as described in connection with the examples in FIGS. 4A, 4B, 5A, 5B, 5C, and 6. Also, the at least one of the one or more flexible subband resources, the one or more uplink subband resources, or the one or more downlink subband resources may be configurable or flexible, as described in connection with the examples in FIGS. 4A, 4B, 5A, 5B, 5C, and 6. Further, each of the one or more flexible subband resources may include at least one uplink subband resource or at least one downlink subband resource, as described in connection with the examples in FIGS. 4A, 4B, 5A, 5B, 5C, and 6.

At 704, the apparatus may signal configuration information of the frame structure including the plurality of slots, as described in connection with the examples in FIGS. 4A, 4B, 5A, 5B, 5C, and 6. For example, base station 604 may signal configuration information of the frame structure including the plurality of slots, as described in connection with 620 in FIG. 6. Further, 704 may be performed by determination component 1140 in FIG. 11. In some aspects, the configuration information of the frame structure including the plurality of slots may be signaled to another base station, where the plurality of slots may include one or more flexible slots with multiple subband resources.

At 706, the apparatus may communicate data via the frame structure including the plurality of slots, as described in connection with the examples in FIGS. 4A, 4B, 5A, 5B, 5C, and 6. For example, base station 604 may communicate data via the frame structure including the plurality of slots, as described in connection with 630 in FIG. 6. Further, 706 may be performed by determination component 1140 in FIG. 11.

Figure 8:
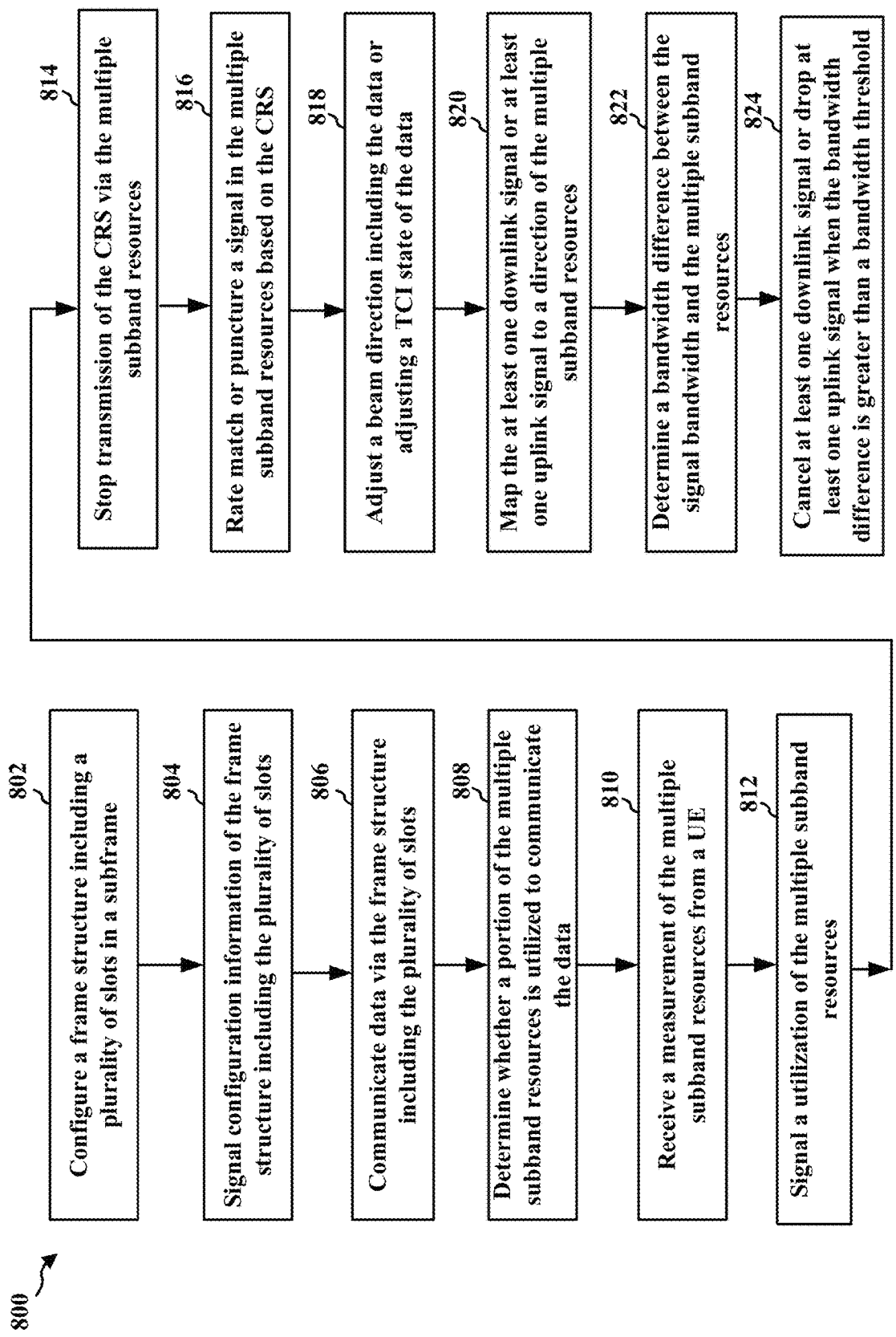
FIG. 8 is a flowchart of a method of wireless communication.

FIG. 8 is a flowchart 800 of a method of wireless communication. The method may be performed by a base station or a component of a base station (e.g., the base station 102, 180, 310, 604; apparatus 1102; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 802, the apparatus may configure a frame structure including a plurality of slots in a subframe, the plurality of slots including at least one of one or more downlink slots, one or more uplink slots, or one or more flexible slots, each of the one or more flexible slots including multiple subband resources, as described in connection with the examples in FIGS. 4A, 4B, 5A, 5B, 5C, and 6. For example, base station 604 may configure a frame structure including a plurality of slots in a subframe, the plurality of slots including at least one of one or more downlink slots, one or more uplink slots, or one or more flexible slots, each of the one or more flexible slots including multiple subband resources, as described in connection with 610 in FIG. 6. Further, 802 may be performed by determination component 1140 in FIG. 11. In some instances, the multiple subband resources may be frequency division multiplexing (FDM) resources, as described in connection with the examples in FIGS. 4A, 4B, 5A, 5B, 5C, and 6. Also, the frame structure may be a frequency division duplex (FDD) frame structure, as described in connection with the examples in FIGS. 4A, 4B, 5A, 5B, 5C, and 6.

In some aspects, the multiple subband resources may include at least one of one or more flexible subband resources, one or more uplink subband resources, or one or more downlink subband resources, as described in connection with the examples in FIGS. 4A, 4B, 5A, 5B, 5C, and 6. Also, the at least one of the one or more flexible subband resources, the one or more uplink subband resources, or the one or more downlink subband resources may be configurable or flexible, as described in connection with the examples in FIGS. 4A, 4B, 5A, 5B, 5C, and 6. Further, each of the one or more flexible subband resources may include at least one uplink subband resource or at least one downlink subband resource, as described in connection with the examples in FIGS. 4A, 4B, 5A, 5B, 5C, and 6.

At 804, the apparatus may signal configuration information of the frame structure including the plurality of slots, as described in connection with the examples in FIGS. 4A, 4B, 5A, 5B, 5C, and 6. For example, base station 604 may signal configuration information of the frame structure including the plurality of slots, as described in connection with 620 in FIG. 6. Further, 804 may be performed by determination component 1140 in FIG. 11. In some aspects, the configuration information of the frame structure including the plurality of slots may be signaled to another base station, where the plurality of slots may include one or more flexible slots with multiple subband resources.

At 806, the apparatus may communicate data via the frame structure including the plurality of slots, as described in connection with the examples in FIGS. 4A, 4B, 5A, 5B, 5C, and 6. For example, base station 604 may communicate data via the frame structure including the plurality of slots, as described in connection with 630 in FIG. 6. Further, 806 may be performed by determination component 1140 in FIG. 11.

At 808, the apparatus may determine whether a portion of the multiple subband resources is utilized to transmit, receive, or communicate the data, as described in connection with the examples in FIGS. 4A, 4B, 5A, 5B, 5C, and 6. For example, base station 604 may determine whether a portion of the multiple subband resources is utilized to transmit, receive, or communicate the data, as described in connection with 640 in FIG. 6. Further, 808 may be performed by determination component 1140 in FIG. 11.

At 810, the apparatus may receive a measurement of multiple subband resources from a UE, as described in connection with the examples in FIGS. 4A, 4B, 5A, 5B, 5C, and 6. For example, base station 604 may receive a measurement of multiple subband resources from a UE, as described in connection with 652 in FIG. 6. Further, 810 may be performed by determination component 1140 in FIG. 11.

At 812, the apparatus may signal a utilization of multiple subband resources, as described in connection with the examples in FIGS. 4A, 4B, 5A, 5B, 5C, and 6. For example, base station 604 may signal a utilization of multiple subband resources, as described in connection with 660 in FIG. 6. Further, 812 may be performed by determination component 1140 in FIG. 11. In some aspects, a cell-specific reference symbol (CRS) may be communicated via the multiple subband resources of the frame structure, as described in connection with the examples in FIGS. 4A, 4B, 5A, 5B, 5C, and 6.

At 814, the apparatus may stop transmission of the CRS via the multiple subband resources, as described in connection with the examples in FIGS. 4A, 4B, 5A, 5B, 5C, and 6. For example, base station 604 may stop transmission of the CRS via the multiple subband resources, as described in connection with 662 in FIG. 6. Further, 814 may be performed by determination component 1140 in FIG. 11.

At 816, the apparatus may rate match or puncture a signal in the multiple subband resources based on the CRS, as described in connection with the examples in FIGS. 4A, 4B, 5A, 5B, 5C, and 6. For example, base station 604 may rate match or puncture a signal in the multiple subband resources based on the CRS, as described in connection with 670 in FIG. 6. Further, 816 may be performed by determination component 1140 in FIG. 11.

At 818, the apparatus may adjust a beam direction including the data or adjusting a transmission configuration indication (TCI) state of the data based on interference, as described in connection with the examples in FIGS. 4A, 4B, 5A, 5B, 5C, and 6. For example, base station 604 may adjust a beam direction including the data or adjusting a transmission configuration indication (TCI) state of the data based on interference, as described in connection with 672 in FIG. 6. Further, 818 may be performed by determination component 1140 in FIG. 11.

In some aspects, the data may include at least one downlink signal or at least one uplink signal, where the at least one downlink signal or at least one uplink signal may include a signal bandwidth, as described in connection with the examples in FIGS. 4A, 4B, 5A, 5B, 5C, and 6. Also, the at least one downlink signal may be a channel state information reference signal (CSI-RS) and the at least one uplink signal may be a sounding reference signal (SRS), as described in connection with the examples in FIGS. 4A, 4B, 5A, 5B, 5C, and 6.

At 820, the apparatus may map the at least one downlink signal or at least one uplink signal to a direction of the multiple subband resources, as described in connection with the examples in FIGS. 4A, 4B, 5A, 5B, 5C, and 6. For example, base station 604 may map the at least one downlink signal or at least one uplink signal to a direction of the multiple subband resources, as described in connection with 680 in FIG. 6. Further, 820 may be performed by determination component 1140 in FIG. 11.

At 822, the apparatus may determine a bandwidth difference between the signal bandwidth and the multiple subband resources, as described in connection with the examples in FIGS. 4A, 4B, 5A, 5B, 5C, and 6. For example, base station 604 may determine a bandwidth difference between the signal bandwidth and the multiple subband resources, as described in connection with 682 in FIG. 6. Further, 822 may be performed by determination component 1140 in FIG. 11.

At 824, the apparatus may cancel the at least one downlink signal or drop the at least one uplink signal when the bandwidth difference is greater than a bandwidth threshold, as described in connection with the examples in FIGS. 4A, 4B, 5A, 5B, 5C, and 6. For example, base station 604 may cancel the at least one downlink signal or drop the at least one uplink signal when the bandwidth difference is greater than a bandwidth threshold, as described in connection with 690 in FIG. 6. Further, 824 may be performed by determination component 1140 in FIG. 11. In some instances, the bandwidth difference may be greater than the bandwidth threshold when the at least one downlink signal or the at least one uplink signal is at least partially outside a direction of the multiple subband resources, as described in connection with the examples in FIGS. 4A, 4B, 5A, 5B, 5C, and 6.

Figure 9:
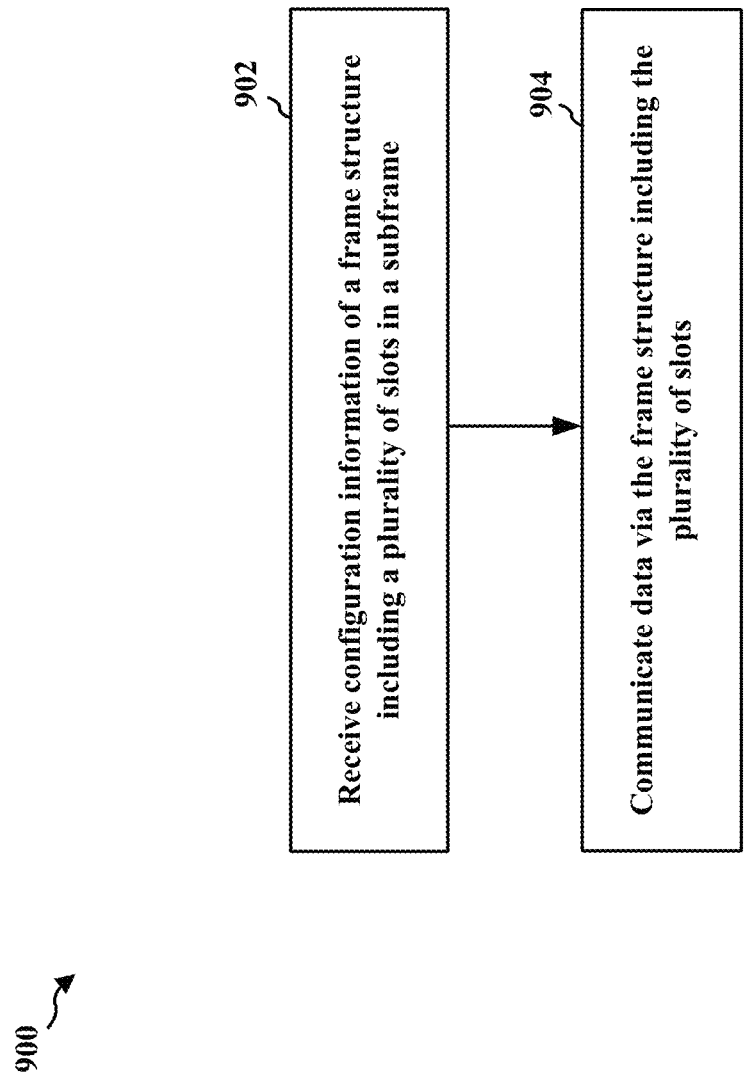
FIG. 9 is a flowchart of a method of wireless communication.

FIG. 9 is a flowchart 900 of a method of wireless communication. The method may be performed by a UE or a component of a UE (e.g., the UE 104, 350, 602; apparatus 1202; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 902, the apparatus may receive configuration information of a frame structure including a plurality of slots in a subframe, the plurality of slots including at least one of one or more downlink slots, one or more uplink slots, or one or more flexible slots, each of the one or more flexible slots including multiple subband resources, as described in connection with the examples in FIGS. 4A, 4B, 5A, 5B, 5C, and 6. For example, UE 602 may receive configuration information of a frame structure including a plurality of slots in a subframe, the plurality of slots including at least one of one or more downlink slots, one or more uplink slots, or one or more flexible slots, each of the one or more flexible slots including multiple subband resources, as described in connection with 622 in FIG. 6. Further, 902 may be performed by determination component 1240 in FIG. 12. In some instances, the multiple subband resources may be frequency division multiplexing (FDM) resources, as described in connection with the examples in FIGS. 4A, 4B, 5A, 5B, 5C, and 6. Also, the frame structure may be a frequency division duplex (FDD) frame structure, as described in connection with the examples in FIGS. 4A, 4B, 5A, 5B, 5C, and 6.

In some aspects, the multiple subband resources may include at least one of one or more flexible subband resources, one or more uplink subband resources, or one or more downlink subband resources, as described in connection with the examples in FIGS. 4A, 4B, 5A, 5B, 5C, and 6. Additionally, the at least one of the one or more flexible subband resources, the one or more uplink subband resources, or the one or more downlink subband resources may be configurable or flexible, as described in connection with the examples in FIGS. 4A, 4B, 5A, 5B, 5C, and 6. Further, each of the one or more flexible subband resources may include at least one uplink subband resource or at least one downlink subband resource, as described in connection with the examples in FIGS. 4A, 4B, 5A, 5B, 5C, and 6.

At 904, the apparatus may communicate data via the frame structure including the plurality of slots, as described in connection with the examples in FIGS. 4A, 4B, 5A, 5B, 5C, and 6. For example, UE 602 may communicate data via the frame structure including the plurality of slots, as described in connection with 632 in FIG. 6. Further, 904 may be performed by determination component 1240 in FIG. 12.

Figure 10:
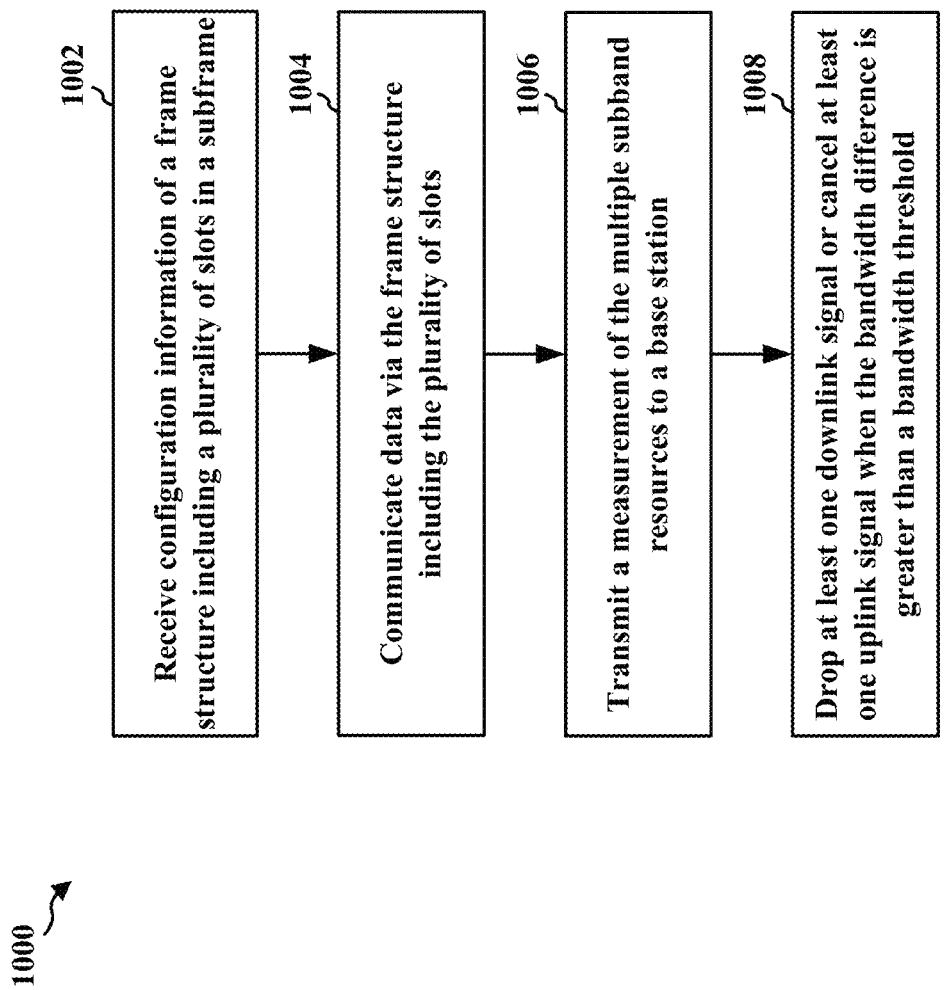
FIG. 10 is a flowchart of a method of wireless communication.

FIG. 10 is a flowchart 1000 of a method of wireless communication. The method may be performed by a UE or a component of a UE (e.g., the UE 104, 350, 602; apparatus 1202; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1002, the apparatus may receive configuration information of a frame structure including a plurality of slots in a subframe, the plurality of slots including at least one of one or more downlink slots, one or more uplink slots, or one or more flexible slots, each of the one or more flexible slots including multiple subband resources, as described in connection with the examples in FIGS. 4A, 4B, 5A, 5B, 5C, and 6. For example, UE 602 may receive configuration information of a frame structure including a plurality of slots in a subframe, the plurality of slots including at least one of one or more downlink slots, one or more uplink slots, or one or more flexible slots, each of the one or more flexible slots including multiple subband resources, as described in connection with 622 in FIG. 6. Further, 1002 may be performed by determination component 1240 in FIG. 12. In some instances, the multiple subband resources may be frequency division multiplexing (FDM) resources, as described in connection with the examples in FIGS. 4A, 4B, 5A, 5B, 5C, and 6. Also, the frame structure may be a frequency division duplex (FDD) frame structure, as described in connection with the examples in FIGS. 4A, 4B, 5A, 5B, 5C, and 6.

In some aspects, the multiple subband resources may include at least one of one or more flexible subband resources, one or more uplink subband resources, or one or more downlink subband resources, as described in connection with the examples in FIGS. 4A, 4B, 5A, 5B, 5C, and 6. Additionally, the at least one of the one or more flexible subband resources, the one or more uplink subband resources, or the one or more downlink subband resources may be configurable or flexible, as described in connection with the examples in FIGS. 4A, 4B, 5A, 5B, 5C, and 6. Further, each of the one or more flexible subband resources may include at least one uplink subband resource or at least one downlink subband resource, as described in connection with the examples in FIGS. 4A, 4B, 5A, 5B, 5C, and 6.

At 1004, the apparatus may communicate data via the frame structure including the plurality of slots, as described in connection with the examples in FIGS. 4A, 4B, 5A, 5B, 5C, and 6. For example, UE 602 may communicate data via the frame structure including the plurality of slots, as described in connection with 632 in FIG. 6. Further, 1004 may be performed by determination component 1240 in FIG. 12.

In some aspects, the data may include at least one downlink signal or at least one uplink signal, where the at least one downlink signal or at least one uplink signal may include a signal bandwidth, as described in connection with the examples in FIGS. 4A, 4B, 5A, 5B, 5C, and 6. Also, the at least one downlink signal may be a channel state information reference signal (CSI-RS) and the at least one uplink signal may be a sounding reference signal (SRS), as described in connection with the examples in FIGS. 4A, 4B, 5A, 5B, 5C, and 6. In some instances, a portion of the multiple subband resources may be utilized to communicate the data, as described in connection with the examples in FIGS. 4A, 4B, 5A, 5B, 5C, and 6. Further, a utilization of the multiple subband resources may be signaled, as described in connection with the examples in FIGS. 4A, 4B, 5A, 5B, 5C, and 6.

Additionally, the signal bandwidth and the multiple subband resources may include a bandwidth difference, as described in connection with the examples in FIGS. 4A, 4B, 5A, 5B, 5C, and 6. The at least one downlink signal or the at least one uplink signal may be dropped when the bandwidth difference is greater than a bandwidth threshold, as described in connection with the examples in FIGS. 4A, 4B, 5A, 5B, 5C, and 6. Moreover, the bandwidth difference may be greater than the bandwidth threshold when the at least one downlink signal or the at least one uplink signal is at least partially outside a direction of the multiple subband resources, as described in connection with the examples in FIGS. 4A, 4B, 5A, 5B, 5C, and 6. In some instances, the at least one downlink signal or at least one uplink signal may be mapped to a direction of the multiple subband resources, as described in connection with the examples in FIGS. 4A, 4B, 5A, 5B, 5C, and 6.

At 1006, the apparatus may transmit a measurement of the multiple subband resources to a base station, as described in connection with the examples in FIGS. 4A, 4B, 5A, 5B, 5C, and 6. For example, UE 602 may transmit a measurement of the multiple subband resources to a base station, as described in connection with 650 in FIG. 6. Further, 1006 may be performed by determination component 1240 in FIG. 12.

At 1008, the apparatus may drop the at least one downlink signal or cancel the at least one uplink signal when the bandwidth difference is greater than a bandwidth threshold, as described in connection with the examples in FIGS. 4A, 4B, 5A, 5B, 5C, and 6. For example, UE 602 may drop the at least one downlink signal or cancel the at least one uplink signal when the bandwidth difference is greater than a bandwidth threshold, as described in connection with 692 in FIG. 6. Further, 1008 may be performed by determination component 1240 in FIG. 12.

In some aspects, a cell-specific reference symbol (CRS) may be received, transmitted, or communicated via the multiple subband resources of the frame structure, as described in connection with the examples in FIGS. 4A, 4B, 5A, 5B, 5C, and 6. Also, reception of the CRS via the multiple subband resources may be stopped, as described in connection with the examples in FIGS. 4A, 4B, 5A, 5B, 5C, and 6. Further, the multiple subband resources may be rate matched based on the CRS, as described in connection with the examples in FIGS. 4A, 4B, 5A, 5B, 5C, and 6. In addition, a beam direction including the data may be adjusted or a transmission configuration indication (TCI) state of the data may be adjusted, as described in connection with the examples in FIGS. 4A, 4B, 5A, 5B, 5C, and 6.

Figure 11:
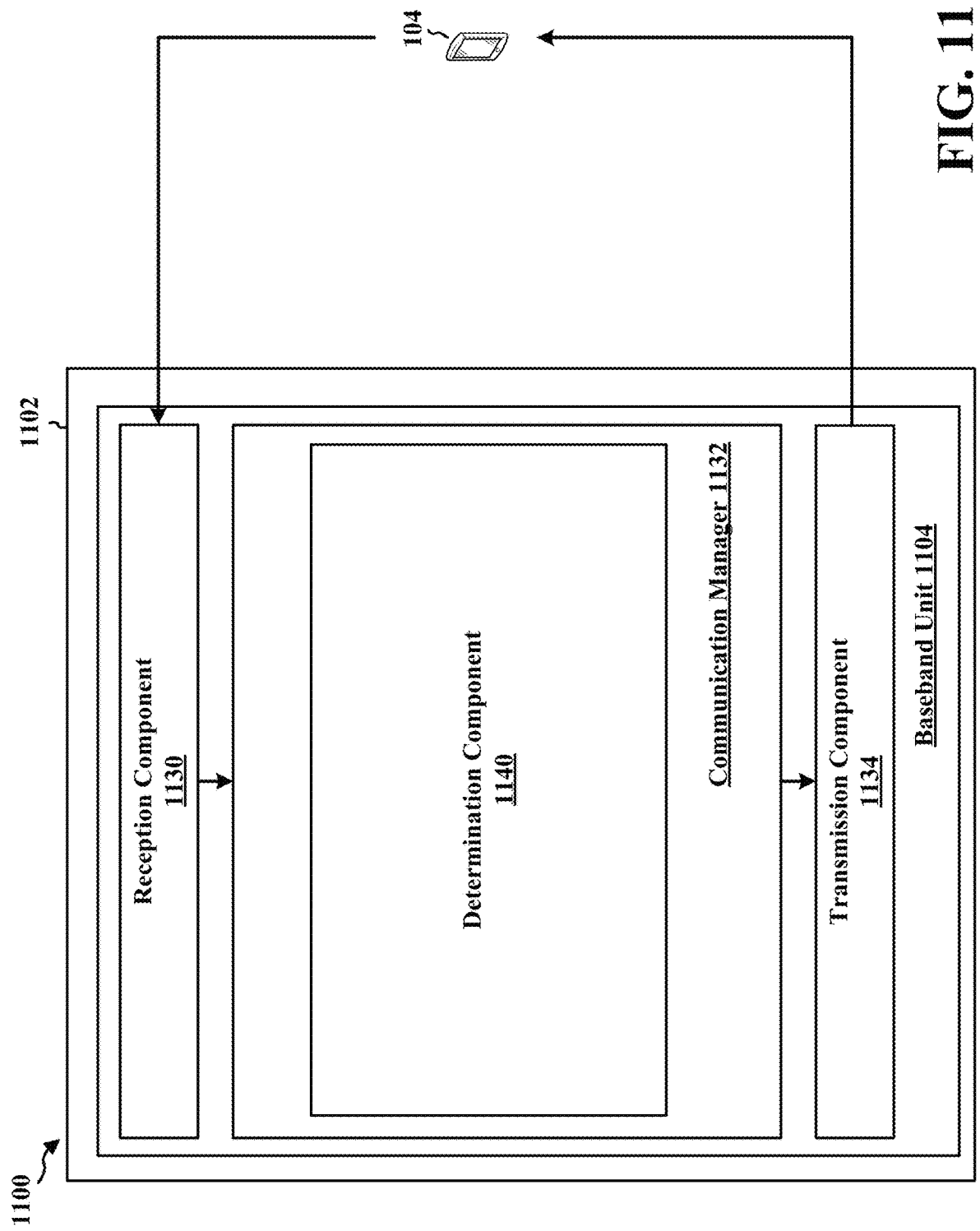
FIG. 11 is a diagram illustrating an example of a hardware implementation for an example apparatus.

FIG. 11 is a diagram 1100 illustrating an example of a hardware implementation for an apparatus 1102. The apparatus 1102 is a base station and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a determination component 1140 that is configured to configure a frame structure including a plurality of slots in a subframe, the plurality of slots including at least one of one or more downlink slots, one or more uplink slots, or one or more flexible slots, each of the one or more flexible slots including multiple subband resources, e.g., as described in connection with step 802 above. Determination component 1140 may also be configured to signal configuration information of the frame structure including the plurality of slots, e.g., as described in connection with step 804 above. Determination component 1140 may also be configured to communicate data via the frame structure including the plurality of slots, e.g., as described in connection with step 806 above. Determination component 1140 may also be configured to determine whether a portion of the multiple subband resources is utilized to communicate the data, e.g., as described in connection with step 808 above. Determination component 1140 may also be configured to receive a measurement of the multiple subband resources from a UE, e.g., as described in connection with step 810 above. Determination component 1140 may also be configured to signal a utilization of the multiple subband resources, e.g., as described in connection with step 812 above. Determination component 1140 may also be configured to stop transmission of the CRS via the multiple subband resources, e.g., as described in connection with step 814 above. Determination component 1140 may also be configured to rate match the multiple subband resources based on the CRS, e.g., as described in connection with step 816 above. Determination component 1140 may also be configured to adjust a beam direction including the data or adjusting a transmission configuration indication (TCI) state of the data based on interference, e.g., as described in connection with step 818 above. Determination component 1140 may also be configured to map the at least one downlink signal or at least one uplink signal to a direction of the multiple subband resources, e.g., as described in connection with step 820 above. Determination component 1140 may also be configured to determine a bandwidth difference between the signal bandwidth and the multiple subband resources, e.g., as described in connection with step 822 above.

Determination component 1140 may also be configured to cancel the at least one downlink signal or drop the at least one uplink signal when the bandwidth difference is greater than a bandwidth threshold, e.g., as described in connection with step 824 above.

The apparatus may include additional components that perform each of the blocks of the algorithm in the aforementioned flowcharts of FIGS. 6, 7, and 8. As such, each block in the aforementioned flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for configuring a frame structure including a plurality of slots in a subframe, the plurality of slots including at least one of one or more downlink slots, one or more uplink slots, or one or more flexible slots, each of the one or more flexible slots including multiple subband resources; means for signaling configuration information of the frame structure including the plurality of slots; means for communicating data via the frame structure including the plurality of slots; means for determining whether a portion of the multiple subband resources is utilized to communicate the data; means for receiving a measurement of the multiple subband resources from a UE; means for signaling a utilization of the multiple subband resources; means for stopping transmission of the CRS via the multiple subband resources; means for rate matching the multiple subband resources based on the CRS; means for adjusting a beam direction including the data or adjusting a transmission configuration indication (TCI) state of the data based on interference; means for mapping the at least one downlink signal or at least one uplink signal to a direction of the multiple subband resources; means for determining a bandwidth difference between the signal bandwidth and the multiple subband resources; and means for canceling the at least one downlink signal or means for dropping the at least one uplink signal when the bandwidth difference is greater than a bandwidth threshold. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
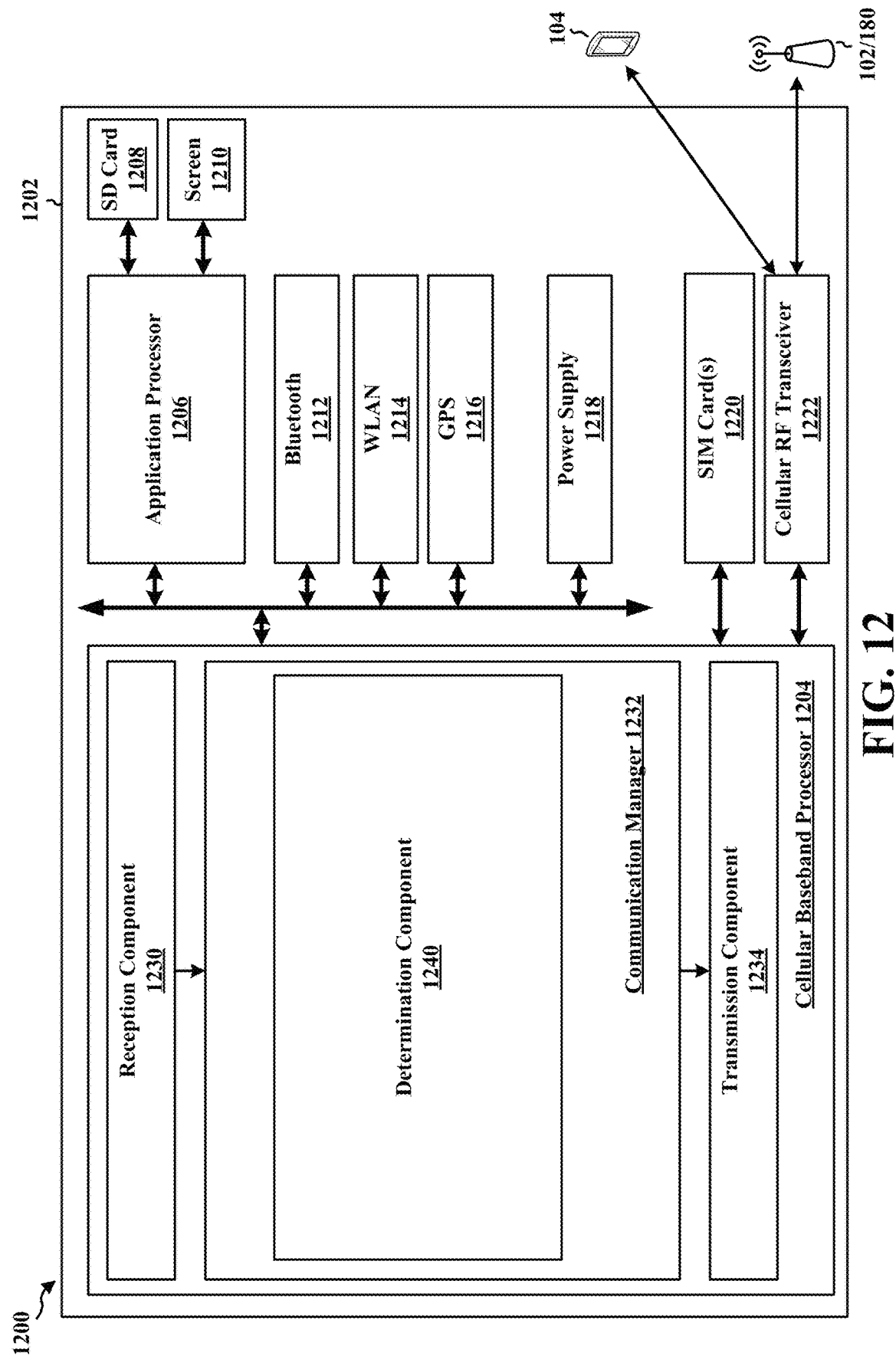
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured to receive configuration information of a frame structure including a plurality of slots in a subframe, the plurality of slots including at least one of one or more downlink slots, one or more uplink slots, or one or more flexible slots, each of the one or more flexible slots including multiple subband resources, e.g., as described in connection with step 1002 above. Determination component 1240 may also be configured to communicate data via the frame structure including the plurality of slots, e.g., as described in connection with step 1004 above. Determination component 1240 may also be configured to transmit a measurement of the multiple subband resources to a base station, e.g., as described in connection with step 1006 above. Determination component 1240 may also be configured to drop at least one downlink signal or cancel at least one uplink signal when the bandwidth difference is greater than a bandwidth threshold, e.g., as described in connection with step 1008 above.

The apparatus may include additional components that perform each of the blocks of the algorithm in the aforementioned flowcharts of FIGS. 6, 9, and 10. As such, each block in the aforementioned flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving configuration information of a frame structure including a plurality of slots in a subframe, the plurality of slots including at least one of one or more downlink slots, one or more uplink slots, or one or more flexible slots, each of the one or more flexible slots including multiple subband resources; means for communicating data via the frame structure including the plurality of slots; means for transmitting a measurement of the multiple subband resources to a base station; and means for dropping the at least one downlink signal or means for canceling the at least one uplink signal when the bandwidth difference is greater than a bandwidth threshold. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flow charts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to: configure a frame structure including a plurality of slots in a subframe, the plurality of slots including at least one of one or more downlink slots, one or more uplink slots, or one or more flexible slots, each of the one or more flexible slots including multiple subband resources; signal configuration information of the frame structure including the plurality of slots; and communicate data via the frame structure including the plurality of slots.

Aspect 2 is the apparatus of aspect 1, where the multiple subband resources include at least one of one or more flexible subband resources, one or more uplink subband resources, or one or more downlink subband resources.

Aspect 3 is the apparatus of any of aspects 1 and 2, where the at least one of the one or more flexible subband resources, the one or more uplink subband resources, or the one or more downlink subband resources are configurable.

Aspect 4 is the apparatus of any of aspects 1 to 3, where each of the one or more flexible subband resources includes at least one uplink subband resource or at least one downlink subband resource.

Aspect 5 is the apparatus of any of aspects 1 to 4, where the data includes at least one downlink signal or downlink channel or at least one uplink signal or uplink channel, the at least one downlink signal or at least one uplink signal including a signal bandwidth.

Aspect 6 is the apparatus of any of aspects 1 to 5, where the at least one processor is further configured to: determine a bandwidth difference between the signal bandwidth and the multiple subband resources.

Aspect 7 is the apparatus of any of aspects 1 to 6, where the at least one processor is further configured to: cancel the at least one downlink signal or drop the at least one uplink signal when the bandwidth difference is greater than a bandwidth threshold.

Aspect 8 is the apparatus of any of aspects 1 to 7, where the bandwidth difference is greater than the bandwidth threshold when the at least one downlink signal or the at least one uplink signal is at least partially outside a direction of the multiple subband resources.

Aspect 9 is the apparatus of any of aspects 1 to 8, where the at least one processor is further configured to: map the at least one downlink signal or at least one uplink signal to a direction of the multiple subband resources.

Aspect 10 is the apparatus of any of aspects 1 to 9, where the at least one downlink signal is a channel state information reference signal (CSI-RS), tracking reference signal (TRS), or synchronization signal and the at least one uplink signal is a sounding reference signal (SRS).

Aspect 11 is the apparatus of any of aspects 1 to 10, where the at least one processor is further configured to: determine whether a portion of the multiple subband resources is utilized to communicate the data.

Aspect 12 is the apparatus of any of aspects 1 to 11, where the at least one processor is further configured to: receive a measurement of the multiple subband resources from a UE.

Aspect 13 is the apparatus of any of aspects 1 to 12, where the configuration information of the frame structure including the plurality of slots is signaled to another base station, the plurality of slots including the one or more flexible slots with the multiple subband resources.

Aspect 14 is the apparatus of any of aspects 1 to 13, where a cell-specific reference symbol (CRS) is communicated via the multiple subband resources of the frame structure.

Aspect 15 is the apparatus of any of aspects 1 to 14, where the at least one processor is further configured to: stop transmission of the CRS via the multiple subband resources.

Aspect 16 is the apparatus of any of aspects 1 to 15, where the at least one processor is further configured to: rate match or puncture a signal in the multiple subband resources based on the CRS.

Aspect 17 is the apparatus of any of aspects 1 to 16, where the at least one processor is further configured to: adjust a beam direction including the data or adjusting a transmission configuration indication (TCI) state of the data based on interference.

Aspect 18 is the apparatus of any of aspects 1 to 17, where the multiple subband resources are frequency division multiplexing (FDM) resources.

Aspect 19 is the apparatus of any of aspects 1 to 18, where the frame structure is a frequency division duplex (FDD) frame structure.

Aspect 20 is the apparatus of any of aspects 1 to 19, further including a transceiver coupled to the at least one processor.

Aspect 21 is a method of wireless communication for implementing any of aspects 1 to 20.

Aspect 22 is an apparatus for wireless communication including means for implementing any of aspects 1 to 20.

Aspect 23 is a computer-readable medium storing computer executable code, where the code when executed by a processor causes the processor to implement any of aspects 1 to 20.

Aspect 24 is an apparatus for wireless communication at a UE including at least one processor coupled to a memory and configured to: receive configuration information of a frame structure including a plurality of slots in a subframe, the plurality of slots including at least one of one or more downlink slots, one or more uplink slots, or one or more flexible slots, each of the one or more flexible slots including multiple subband resources; and communicate data via the frame structure including the plurality of slots.

Aspect 25 is the apparatus of aspect 24, where the multiple subband resources include at least one of one or more flexible subband resources, one or more uplink subband resources, or one or more downlink subband resources.

Aspect 26 is the apparatus of any of aspects 24 and 25, where the at least one processor is further configured to: the at least one of the one or more flexible subband resources, the one or more uplink subband resources, or the one or more downlink subband resources are configurable.

Aspect 27 is the apparatus of any of aspects 24 to 26, where each of the one or more flexible subband resources include at least one uplink subband resource or at least one downlink subband resource.

Aspect 28 is the apparatus of any of aspects 24 to 27, where the data includes at least one downlink signal or downlink channel or at least one uplink signal or uplink channel, the at least one downlink signal or at least one uplink signal including a signal bandwidth.

Aspect 29 is the apparatus of any of aspects 24 to 28, where the signal bandwidth and the multiple subband resources include a bandwidth difference.

Aspect 30 is the apparatus of any of aspects 24 to 29, where the at least one processor is further configured to: drop the at least one downlink signal or cancel the at least one uplink signal when the bandwidth difference is greater than a bandwidth threshold.

Aspect 31 is the apparatus of any of aspects 24 to 30, where the bandwidth difference is greater than the bandwidth threshold when the at least one downlink signal or the at least one uplink signal is at least partially outside a direction of the multiple subband resources.

Aspect 32 is the apparatus of any of aspects 24 to 31, where the at least one downlink signal or at least one uplink signal is mapped to a direction of the multiple subband resources.

Aspect 33 is the apparatus of any of aspects 24 to 32, where the at least one downlink signal is a channel state information reference signal (CSI-RS), tracking reference signal (TRS), or synchronization signal and the at least one uplink signal is a sounding reference signal (SRS).

Aspect 34 is the apparatus of any of aspects 24 to 33, where a portion of the multiple subband resources is utilized to communicate the data.

Aspect 35 is the apparatus of any of aspects 24 to 34, where the at least one processor is further configured to: transmit a measurement of the multiple subband resources to a base station.

Aspect 36 is the apparatus of any of aspects 24 to 35, where a utilization of the multiple subband resources is signaled.

Aspect 37 is the apparatus of any of aspects 24 to 36, where a cell-specific reference symbol (CRS) is communicated via the multiple subband resources of the frame structure.

Aspect 38 is the apparatus of any of aspects 24 to 37, where reception of the CRS via the multiple subband resources is stopped.

Aspect 39 is the apparatus of any of aspects 24 to 38, where a signal in the multiple subband resources is rate matched or punctured based on the CRS.

Aspect 40 is the apparatus of any of aspects 24 to 39, where a beam direction including the data is adjusted or a transmission configuration indication (TCI) state of the data is adjusted.

Aspect 41 is the apparatus of any of aspects 24 to 40, where the multiple subband resources are frequency division multiplexing (FDM) resources.

Aspect 42 is the apparatus of any of aspects 24 to 41, where the frame structure is a frequency division duplex (FDD) frame structure.

Aspect 43 is the apparatus of any of aspects 24 to 42, further including a transceiver coupled to the at least one processor.

Aspect 44 is a method of wireless communication for implementing any of aspects 24 to 43.

Aspect 45 is an apparatus for wireless communication including means for implementing any of aspects 24 to 43.

Aspect 46 is a computer-readable medium storing computer executable code, where the code when executed by a processor causes the processor to implement any of aspects 24 to 43.

What is claimed is:

1. An apparatus for wireless communication at a base station, comprising:
   memory; and
   at least one processor coupled to the memory and configured to:
   configure a frame structure including a plurality of slots in a subframe, the plurality of slots including at least one of one or more downlink slots, one or more uplink slots, or one or more flexible slots, each of the one or more flexible slots including multiple subband resources;
   signal configuration information of the frame structure including the plurality of slots; and
   communicate data via the frame structure including the plurality of slots, wherein the data includes at least one downlink signal or downlink channel or at least one uplink signal or uplink channel, the at least one downlink signal or at least one uplink signal including a signal bandwidth, and wherein the at least one processor is further configured to:
  determine a bandwidth difference between the signal bandwidth and the multiple subband resources; and
  cancel the at least one downlink signal or drop the at least one uplink signal when the bandwidth difference is greater than a bandwidth threshold.

2. The apparatus of claim 1, wherein the multiple subband resources include at least one of one or more flexible subband resources, one or more uplink subband resources, or one or more downlink subband resources.

3. The apparatus of claim 2, wherein the at least one of the one or more flexible subband resources, the one or more uplink subband resources, or the one or more downlink subband resources are configurable.

4. The apparatus of claim 2, wherein each of the one or more flexible subband resources includes at least one uplink subband resource or at least one downlink subband resource.

5. The apparatus of claim 1, wherein the bandwidth difference is greater than the bandwidth threshold when the at least one downlink signal or the at least one uplink signal is at least partially outside a direction of the multiple subband resources.

6. The apparatus of claim 1, wherein the at least one processor is further configured to:
  map the at least one downlink signal or at least one uplink signal to a direction of the multiple subband resources.

7. The apparatus of claim 1, wherein the at least one downlink signal is a channel state information reference signal (CSI-RS), tracking reference signal (TRS), or synchronization signal and the at least one uplink signal is a sounding reference signal (SRS).

8. The apparatus of claim 1, wherein the at least one processor is further configured to:
  determine whether a portion of the multiple subband resources is utilized to communicate the data.

9. The apparatus of claim 1, wherein the at least one processor is further configured to:
  receive a measurement of the multiple subband resources from a user equipment (UE).

10. The apparatus of claim 1, wherein to signal the configuration information, the at least one processor is configured to signal the configuration information of the frame structure including the plurality of slots to another base station, the plurality of slots including the one or more flexible slots with the multiple subband resources.

11. The apparatus of claim 1, wherein a cell-specific reference symbol (CRS) is communicated via the multiple subband resources of the frame structure.

12. The apparatus of claim 11, wherein the at least one processor is further configured to:
  stop transmission of the CRS via the multiple subband resources.

13. The apparatus of claim 11, wherein the at least one processor is further configured to:
  rate match or puncture a signal in the multiple subband resources based on the CRS.

14. The apparatus of claim 1, wherein the at least one processor is further configured to:
  adjust a beam direction including the data or adjusting a transmission configuration indication (TCI) state of the data based on interference.

15. The apparatus of claim 1, wherein the multiple subband resources are frequency division multiplexing (FDM) resources and the frame structure is a frequency division duplex (FDD) frame structure.

16. The apparatus of claim 1, further comprising a transceiver coupled to the at least one processor.

17. A method of wireless communication at a base station, comprising:
  configuring a frame structure including a plurality of slots in a subframe, the plurality of slots including at least one of one or more downlink slots, one or more uplink slots, or one or more flexible slots, each of the one or more flexible slots including multiple subband resources;
  signaling configuration information of the frame structure including the plurality of slots; and
  communicating data via the frame structure including the plurality of slots, wherein the data includes at least one downlink signal or downlink channel or at least one uplink signal or uplink channel, the at least one downlink signal or at least one uplink signal including a signal bandwidth, and wherein the method further comprises:
  determining a bandwidth difference between the signal bandwidth and the multiple subband resources; and
  canceling the at least one downlink signal or dropping the at least one uplink signal when the bandwidth difference is greater than a bandwidth threshold.

18. An apparatus for wireless communication at a user equipment (UE), comprising:
  memory; and
  at least one processor coupled to the memory and configured to:
    receive configuration information of a frame structure including a plurality of slots in a subframe, the plurality of slots including at least one of one or more downlink slots, one or more uplink slots, or one or more flexible slots, each of the one or more flexible slots including multiple subband resources; and
    communicate data via the frame structure including the plurality of slots, wherein the data includes at least one downlink signal or downlink channel or at least one uplink signal or uplink channel, the at least one downlink signal or at least one uplink signal including a signal bandwidth, wherein the signal bandwidth and the multiple subband resources include a bandwidth difference, and wherein the at least one processor is further configured to:
      drop the at least one downlink signal or cancel the at least one uplink signal when the bandwidth difference is greater than a bandwidth threshold.

19. The apparatus of claim 18, wherein the multiple subband resources include at least one of one or more flexible subband resources, one or more uplink subband resources, or one or more downlink subband resources.

20. The apparatus of claim 19, wherein the at least one of the one or more flexible subband resources, the one or more uplink subband resources, or the one or more downlink subband resources are configurable.

21. The apparatus of claim 19, wherein each of the one or more flexible subband resources include at least one uplink subband resource or at least one downlink subband resource.

22. The apparatus of claim 18, wherein the bandwidth difference is greater than the bandwidth threshold when the at least one downlink signal or the at least one uplink signal is at least partially outside a direction of the multiple subband resources.

23. The apparatus of claim 18, wherein the at least one downlink signal is a channel state information reference signal (CSI-RS), tracking reference signal (TRS), or synchronization signal and the at least one uplink signal is a sounding reference signal (SRS).

24. The apparatus of claim 18, wherein the at least one processor is further configured to:
   transmit a measurement of the multiple subband resources to a base station; and
   further comprising a transceiver coupled to the at least one processor.

25. A method of wireless communication at a user equipment (UE), comprising:
   receiving configuration information of a frame structure including a plurality of slots in a subframe, the plurality of slots including at least one of one or more downlink slots, one or more uplink slots, or one or more flexible slots, each of the one or more flexible slots including multiple subband resources; and
   communicating data via the frame structure including the plurality of slots, wherein the data includes at least one downlink signal or downlink channel or at least one uplink signal or uplink channel, the at least one downlink signal or at least one uplink signal including a signal bandwidth, wherein the signal bandwidth and the multiple subband resources include a bandwidth difference, and wherein the method further comprises:
   dropping the at least one downlink signal or canceling the at least one uplink signal when the bandwidth difference is greater than a bandwidth threshold.

\* \* \* \* \*